UNITED STATES PATENT OFFICE.

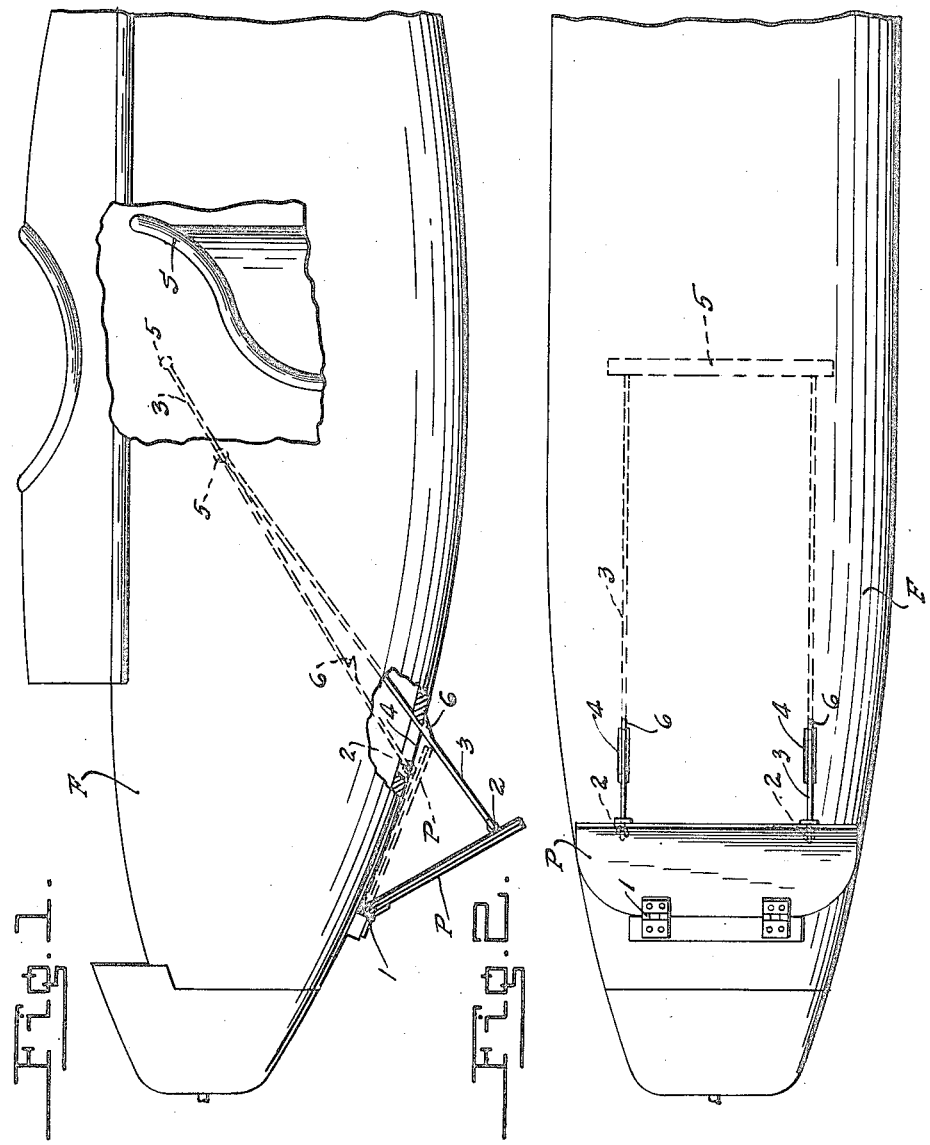

JOHN HAYES, OF BELLE VERNON, PENNSYLVANIA.

AEROPLANE.

1,423,610.  Specification of Letters Patent.  Patented July 25, 1922.

Application filed February 15, 1922. Serial No. 536,723.

*To all whom it may concern:*

Be it known that I, JOHN HAYES, a citizen of the United States, residing at Belle Vernon, in the county of Fayette and State of Pennsylvania, have invented certain new and useful Improvements in Aeroplanes, of which the following is a specification, reference being had to the accompanying drawings.

This invention relates to certain improvements in aeroplanes and it is an object of the invention to provide a device of this general character with novel and improved means whereby resistance can be offered in the event the aeroplane should have a tendency to dive or dip at the forward or nose end portion thereof.

Another object of the invention is to provide an aeroplane with a supplemental plane supported by the bottom portion of the forward or nose part of the fuselage and which may be readily swung by the pilot or other person within the pit of the fuselage into a position to resist diving of the plane.

The invention consists in the details of construction and in the combination and arrangement of the several parts of my improved aeroplane whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation of a fuselage showing applied thereto a supplemental plane constructed in accordance with an embodiment of my invention, a second position of the plane being indicated by dotted lines; and Figure 2 is a view in bottom plan of the device as illustrated in Figure 1.

As disclosed in the accompanying drawings, F denotes the fuselage of an aeroplane which may be of any ordinary or preferred type or structure. Underlying the nose or forward portion of the fuselage F is a plane P having its forward marginal portion hingedly connected, as at 1, to the under portion or wall of the fuselage whereby the plane may be swung toward or from the bottom of the fuselage as may be required.

Operatively engaged, as at 2, with the opposite end portions of the inner or free marginal portion of the plane P are the operating rods 3 which extend inwardly and upwardly, each of said rods extending through an opening or slot 4 in the bottom wall of the fuselage. The rods 3 are of a length to extend within the pit of the fuselage in close proximity to the operator's seat S. The outer end portions of the rods 3, or those end portions within the pit of the fuselage are connected by a cross member 5.

Normally, the plane P lies closely adjacent to the bottom of the fuselage, as indicated by dotted lines in Figure 1, but in the event the aeroplane should have a tendency to dip or dive at the nose, the pilot or other person within the pit of the fuselage pushes upon the cross member 5, resulting in the rods 3 being moved outwardly and the plane P thrown into the position indicated by full lines in Figure 1. With the plane in such position, it serves to lift the forward or nose end of the fuselage and thereby offset the dipping or diving movements.

In the present embodiment of my invention, each of the rods 3 is provided with an enlargement 6 which provides a shoulder adapted to contact with the bottom wall of the fuselage adjacent the inner end of the slot 4 through which said rod 3 passes so that, when the plane is in its outward or working position, the pressure imposed upon said plane is transmitted to the wall of the fuselage, thereby relieving the pilot or other occupant of the pit from holding the plane in its outward or working position.

When it is desired to have the plane P return to its normal position, it is only necessary for the pilot or other person to swing the cross member 5 upwardly which will result in the shoulder 6 of each of the rods 3 being released from its holding position, whereupon the rods 3 are free to move inwardly through the openings 4.

From the foregoing description it is thought to be obvious that an aeroplane constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with the nose portion of the fuselage of an aeroplane, the bottom wall of the fuselage being provided with an opening, a plane underlying said nose portion, means for hingedly connecting the forward marginal portion of the plane to the fuselage for swinging movement toward or from the fuselage, and a rod operatively engaged with the rear marginal portion of the plane and extending within the fuselage through the opening in the bottom wall thereof, said rod providing means within the fuselage for swinging the plane toward or from the bottom of the fuselage, said rod having a shoulder contacting with the bottom wall of the fuselage adjacent the slot when the plane has been moved away from the fuselage.

2. In combination with the nose portion of the fuselage of an aeroplane, the bottom wall of the fuselage being provided with an opening, a plane underlying said nose portion, means for hingedly connecting the forward marginal portion of the plane to the fuselage for swinging movement toward or from the fuselage, and a rod operatively engaged with the rear marginal portion of the plane and extending within the fuselage through the opening in the bottom wall thereof, said rod providing means within the fuselage for swinging the plane toward or from the bottom of the fuselage, said rod having a shoulder contacting with the bottom wall of the fuselage adjacent the slot when the plane has been moved away from the fuselage, said rod being movable within the opening to disengage the shoulder from the bottom wall of the fuselage, said opening being of a size to permit the shoulder when disengaged to pass therethrough.

In testimony whereof I hereunto affix my signature.

JOHN HAYES.